Dec. 5, 1933.  A. THOMAS  1,938,228
ACCOUNTING AND TABULATING MACHINE
Filed Jan. 10, 1930   7 Sheets-Sheet 1

INVENTOR:—
ARTHUR THOMAS.
PER:— Sydney E. Page.
ATTORNEY.

Dec. 5, 1933.  A. THOMAS  1,938,228

ACCOUNTING AND TABULATING MACHINE

Filed Jan. 10, 1930  7 Sheets-Sheet 2

INVENTOR:—
ARTHUR THOMAS.
PER:— Sydney E. Page.
ATTORNEY.

Dec. 5, 1933.  A. THOMAS  1,938,228
ACCOUNTING AND TABULATING MACHINE
Filed Jan. 10, 1930    7 Sheets-Sheet 3

INVENTOR:—
ARTHUR THOMAS.
PER:— Sydney E. Page.
ATTORNEY.

Dec. 5, 1933.    A. THOMAS    1,938,228
ACCOUNTING AND TABULATING MACHINE
Filed Jan. 10, 1930    7 Sheets-Sheet 4

INVENTOR:—
ARTHUR THOMAS.
PER:— Sydney E. Page.
ATTORNEY.

Dec. 5, 1933.  A. THOMAS  1,938,228
ACCOUNTING AND TABULATING MACHINE
Filed Jan. 10, 1930  7 Sheets-Sheet 5

INVENTOR:—
ARTHUR THOMAS.
PER:— Sydney E. Page.
ATTORNEY.

Dec. 5, 1933.   A. THOMAS   1,938,228
ACCOUNTING AND TABULATING MACHINE
Filed Jan. 10, 1930   7 Sheets-Sheet 6

INVENTOR:—
ARTHUR THOMAS.
PER:— Sydney E. Page.
ATTORNEY.

Dec. 5, 1933.    A. THOMAS    1,938,228
ACCOUNTING AND TABULATING MACHINE
Filed Jan. 10, 1930    7 Sheets-Sheet 7

Patented Dec. 5, 1933

1,938,228

UNITED STATES PATENT OFFICE 1,938,228

ACCOUNTING AND TABULATING MACHINE

Arthur Thomas, Thornton Heath, England, assignor to The Accounting & Tabulating Corporation of Gt. Britain Limited, London, England Application January 10, 1930, Serial No. 419,978, and in Great Britain January 21, 1929

13 Claims. (Cl. 235—58)

This invention relates to tabulating machines controllable by sequences of characteristically perforated record cards to list items and to print totals of data as recorded, and in particular to tabulation printing machines of the type including swingingly mounted tabulating printing actions controllable by the card.

Such machines commonly include a means for taking a total and this total mechanism has been operated by the insertion of a special card in the machine, that is to say, before a series of cards are put through a machine a total card is interposed in the series where it is desired to take a total operation, the card being especially punched to cause the operation of the total mechanism.

In British Patent Specification No. 271,935 an attachment for a tabulating machine is described by which totals are automatically taken on a change of designation in the cards.

From the foregoing it will be seen that as at present constructed tabulating machines can be caused to take a total by employing a special card or by employing an attachment such as is described in the British Patent Specification No. 271,935 referred to above.

Tabulating machines are also provided with manual means for stopping the machine at will, such stopping means including a cut out plunger which, when manipulated, moves, through the agency of a rocking shaft, a latch which declutches the machine from the power drive.

One object of the invention is to provide an improved mechanism for causing a particular operation, such as stopping of the machine, to occur after the machine has executed a predetermined number of cycles.

A further object is to provide means whereby the mechanism according to the invention may be set so as to cause any one of the following operations; stopping of the machine after a predetermined number of cycles, the taking of a total after a predetermined number of cycles, both totalling and stopping after a predetermined number of cycles or stopping after a predetermined number of total strokes has occurred.

In order that the invention may be more clearly understood reference will now be made to the accompanying drawings, which show by way of example some preferred embodiments of the present invention.

Fig. 5 is a side elevation showing details of the setting drum for the counter hereafter more fully referred to;

Figs. 7 and 12 showing actuating means for the feed pawl.

Figs. 8, 11 and 13 showing means for retracting the feed pawl and detent from operative position, and also the means for stopping the machine, Fig. 9 showing means for operating the total mechanism of the machine from the counter, Fig. 10 shows the means for actuating the feed pawls from the total mechanism of the machine.

In the drawings like reference numerals designate the same or similar parts.

Figure 1:
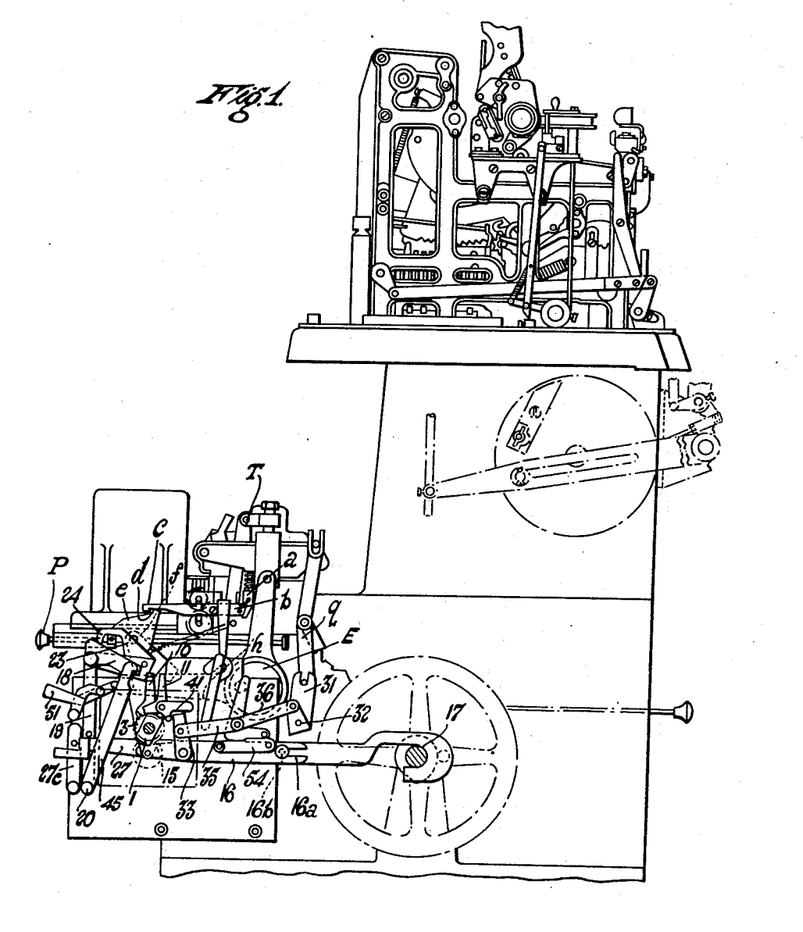
Fig. 1 shows in elevation a tabulator printing machine including swingingly mounted tabulating printing actions, and a total taking attachment as described in British Patent Specification No. 271,935 co-operating with a counter device according to the present invention.
Figure 11:
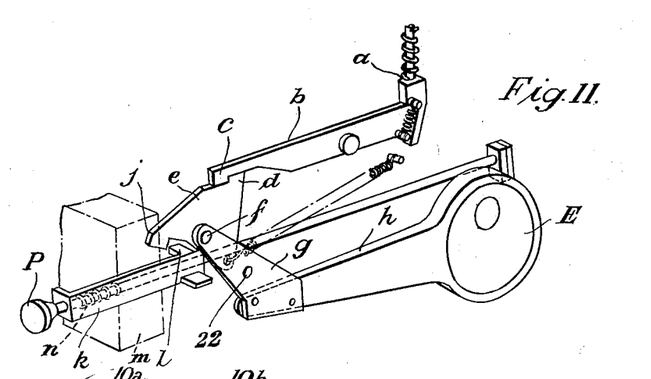

Referring now to Fig. 1 a total taking attachment as described in British Patent Specification No. 271,935 is indicated at T, and includes a pinbox actuated from an eccentric E. The attachment is provided with a sensing pin (not shown) directly connected with a plunger $a$, the arrangement being such that when a card is being sensed in the total taking attachment, the plunger $a$ is held up because the associated sensing pin rests on the card, but when no card is in the attachment the pin continues its downward movement and with the movement of the eccentric the plunger $a$ drops down and actuates an arm $b$, see Figs. 2 and 11, so as to disengage its hooked end $c$ from a lug $d$ conveniently formed on a plate $e$ pivoted at $f$ to a second plate $g$ carried on a horizontal arm $h$ actuated from the eccentric E. The plate member $e$ includes also a claw $j$ which operates a cut out plunger P to stop the machine, the cut out plunger P being mounted in a stirrup $k$ carrying a horizontal lug $l$ adapted to be engaged by the claw $j$ while between the stirrup and a fixed part of the machine indicated at $m$ is a spring $n$. In operation the arm $h$ reciprocates and carries with it the plate $g$ whereupon the plate $e$, from which the claw $c$ has been removed by the arm $b$, falls forward and the claw $j$ engages the lug $l$. Consequently, on the next reciprocating movement of the arm $h$ the lug $l$ is pulled with the plate $e$ and the arm $h$, and through the agency of the stirrup and spring $k$ the plunger P is moved. Thereby a clutch, controlling communication from a power shaft to the main shaft of the machine, is operated and the machine cut off from power.

Normally, the claw $c$ of the arm $b$ engages over the shoulder $d$ of the plate $e$ so that the plate $e$ is merely oscillated about its pivot $f$ by the reciprocations of the arm $h$ from the eccentric E, and it is only when there is no card in the attachment and the plunger $a$ descends that the claw $j$ becomes operative.

Such an arrangement provides automatic stopping means which cause a stoppage of the machine when there is no card in the machine.

A tabulating machine with this attachment and with means for operating the cut out plunger permits a total operation to be taken when a change of designation in the card occurs, as explained in British Patent Specification No. 271,935, and a stopping of the machine.

A preferred form of mechanism according to the invention for operating the cut out plunger after a predetermined number of operations in the machine, comprises a counting device in the form of a nut member 1, see Figs. 4, 5, 6A, 8 and 12, that is to say, it is a rotatable member movable laterally during rotation.

Figure 3:
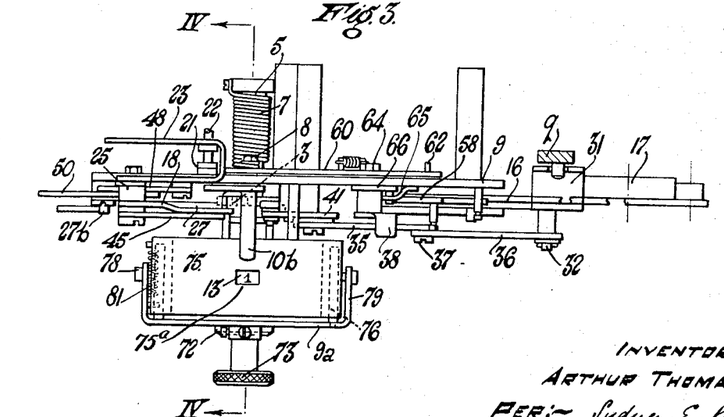
Fig. 3 is a plan view of the counter device.
Figure 4:
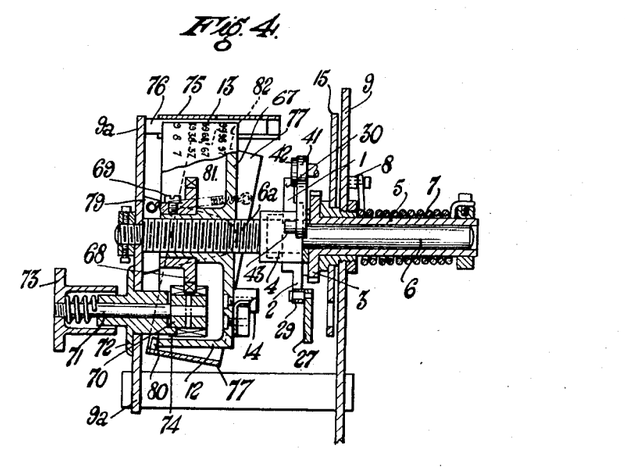
Fig. 4 is a sectional elevation on the line IV—IV of Fig. 3.
Figure 5:
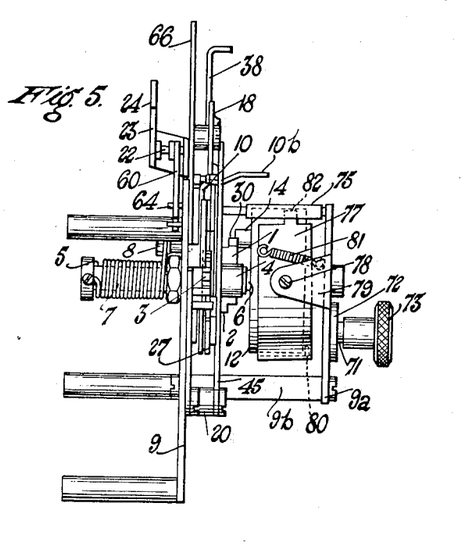
Figure 6:
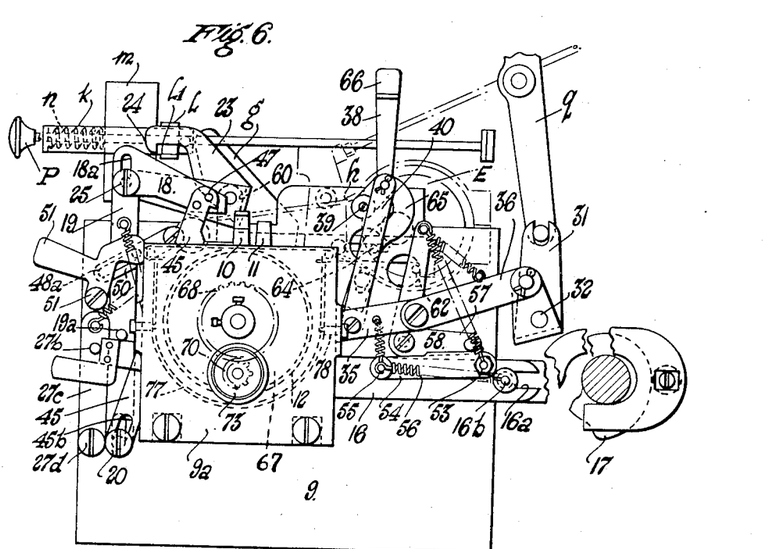
Fig. 6 is a front elevation of the counter device with the setting drum, Fig. 6A being a similar view with the setting drum omitted for the sake of clearness.
Figure 7:
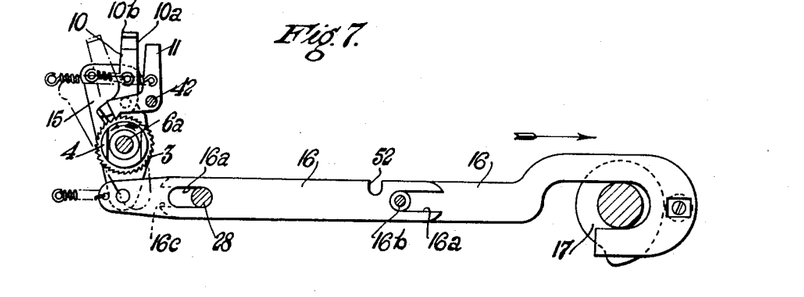
Figs. 7, 8, 9, 10, 11, 12 and 13 show in elevation and perspective the various parts of the counter segregated.
Figure 8:
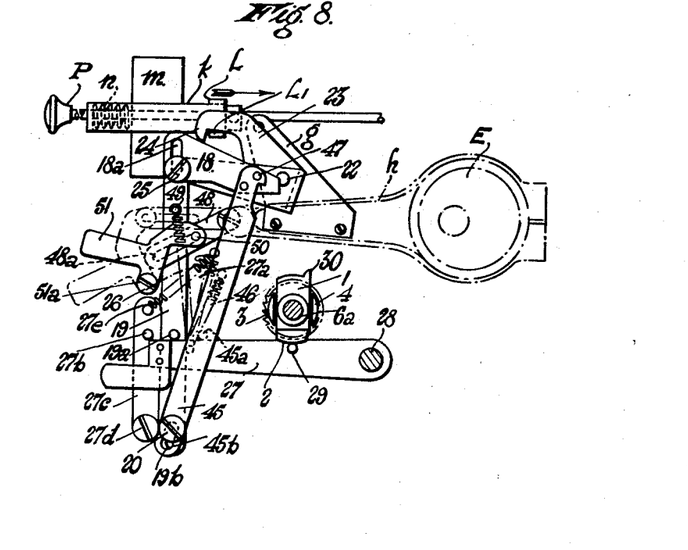

On the periphery of the nut member 1, as clearly shown in Figs. 4, 6A and 8, is a cam 2 hereafter referred to as a "cut out" cam, the member 1 being in telescopic engagement with a ratchet wheel 3 (Fig. 12), conveniently by forming on the ratchet wheel two diametrically opposite posts indicated at 4, preferably of segmental form, which straddle the nut and engage opposed flat sides thereof, as most clearly shown in Figs. 2, 7, 8 and 12. Thereby relative angular movement between the ratchet and the nut member 1 is prevented. The ratchet wheel 3 is carried on a sleeve 5, see Figs. 3 and 4, which is free to rotate on a fixed spindle 6, but is fixed against lateral movement.

The sleeve is extended to form the arbor of a coil spring 7, one end of which is fixed to the sleeve and the other extraneously anchored, for instance, as at 8 to a supporting plate 9 carried by the frame of the machine.

The spindle 6 includes a threaded portion indicated at 6a, Fig. 4, on which the nut member is mounted.

Figures 12, 13:
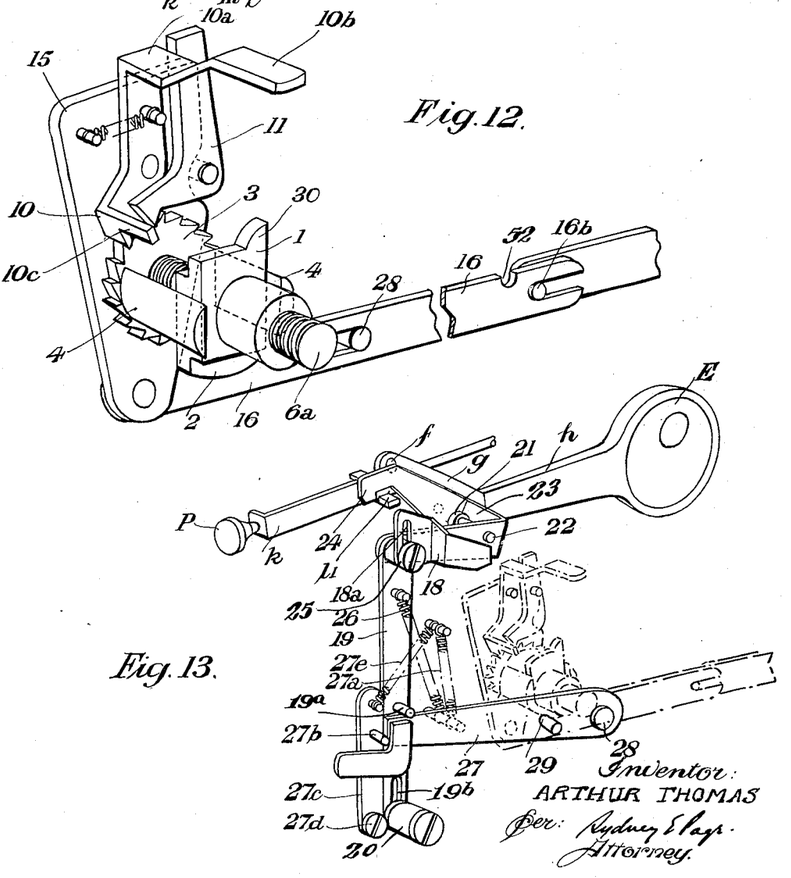

The coil spring 7 is tightened during the step by step rotation of the ratchet wheel 3 on the latter being actuated by a pawl 10, Figs. 6A, 7 and 12, in a manner hereafter referred to, until the actuating pawl 10 and the co-operating detent 11 are rendered inoperative by the cut out cam 2 on the predetermined lateral movement of the nut member being accomplished.

The adjustment of the nut member 1 along the threaded part of the spindle 6a away from the operative position in which it prevents the actuating pawl 10 and the detent 11 from acting, determines the number of operations in the machine permitted before the machine is stopped.

The cam 2 is set in its position of adjustment on the spindle through the agency of a second threaded member indicated at 12 (Fig. 2) and hereafter referred to as the "setting drum" which is mounted on the threaded part 6a of the spindle, and which is disposed on the spindle to limit the retraction of the nut member from its operative position.

The setting drum has on its periphery 13 numbers which indicate, as more particularly hereafter explained, the number of operations in the machine, as determined by each position of the drum on the spindle, which will be performed by the machine before it is stopped.

The back of the drum is provided with a shoulder or stop 14 (Fig. 4) which acts as a stop for the nut member 1, thereby limiting its retraction according to the disposition of the setting drum on the spindle 6.

Supposing now the machine is operating and feed pawl 10 moving the ratchet 3 in an anticlockwise direction, it will be seen that as the spindle 6 is held against rotary movement the nut member 1 is advanced to the actuating pawl 10 and detent 11, the nut member 1 being forced to maintain its angular relation with the ratchet by reason of the posts 4 on the ratchet which straddle it, while the rotation of the ratchet progressively coils the spring 7 until ultimately the cut out cam 2 causes an obstruction of the actuating pawl and detent, thereby freeing the ratchet which is then immediately driven rapidly in clockwise direction by the conserved energy in spring 7 until the nut member 1 has been returned to the stop 14 on the setting drum. When this is accomplished the actuating pawl and detent are again permitted to engage the ratchet, and the whole mechanism is ready for the next advance of the nut member.

The actuation of the ratchet 3 through the agency of the pawl 10 is effected by employing the following construction.

The pawl 10 is fulcrumed at one end of an oscillating lever 15 which is movable about an axis preferably concentric with the ratchet 3, the other end of the lever being connected to a telescopic rod 16 actuated from cam gear 17 as clearly shown in Fig. 7, the cam being mounted on any suitable shaft of the machine so that the actuating pawl 10 moves the ratchet one tooth for each revolution of the main shaft if the machine is to be stopped after a given number of revolutions.

Figure 2:
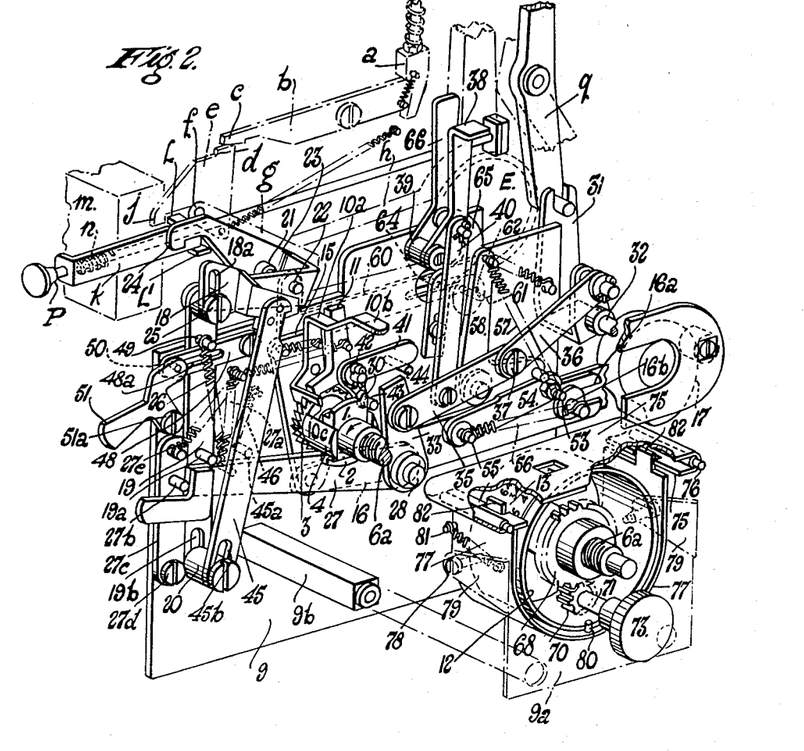
Fig. 2 is a perspective view showing the counter device to an enlarged scale with the setting mechanism in distended relation for sake of clearness.

The feed pawl 10 is conveniently in the form of a bell crank; so also is the detent 11 which latter is pivoted on plate 9, and the free arm of the feed pawl 10 is cranked over as clearly shown in Figs. 2 and 12 to include a part 10a which after slight movement of the pawl 10 engages against the free arm of the detent 11, the cranked portion being extended to form a handle 10b by which the feed pawl and detent can be released by hand operation from the ratchet when desired.

The part 10a of the pawl 10 is automatically operated by an arm 18 (Figs. 6A and 13) hereafter referred to as the "obstructor arm", its function being to engage the feed pawl 10, and free it from the ratchet, the operation of the feed pawl causing similar operation of the detent 11 as just explained by reason of the cranked over portion 10a of the pawl 10 engaging across the free arm of the detent 11.

The obstructor arm 18, Fig. 13, is supported on a spring-controlled lever 19 pivoted on pin 20 carried by plate 9 and is rocked about its pivot upon the arm $h$ being reciprocated in the manner aforesaid from the eccentric E.

To this end the plate $g$ carried by the arm $h$ is provided with a bearing 21 for a pivot pin 22 which forms a support for a U shaped claw member 23 including the claw 24 more particularly hereafter referred to, the claw member 23 in turn being pivotally connected at 25 to the lever 19 aforesaid. Thus, movement of the arm $h$ impressed from the eccentric E through the agency of the plate $g$ and pin 22 causes a similar movement in the U shaped member 23 which is communicated through the pivot 25 to the lever 19. This rocking of the lever 19 about its pivot 20 is transmitted to the obstructor arm 18.

Now in the position shown in Fig. 2, these reciprocations of the obstructor arm 18 will merely cause it to pass to and fro over the cranked portion 10a of the feed pawl. The lever 19 is in slotted engagement as indicated at 19b with its pivot 20 so that it can be displaced axially to an extent whereby the to and fro movement of the obstructor 18 occurring as just explained will cause the nose of the obstructor arm 18 to engage the portion 10a of the pawl and cause the pawl 10 and detent 11 to be rocked clear of the ratchet, thereby freeing the ratchet so that it may be returned to resetting position against abutment 14 of the setting drum 12 under the conserved energy derived from spring 7.

This movement of the lever 19 and the consequential displacement of the obstructor arm to render the feed pawl and detent inoperative, is caused by the cut out cam 2 in a manner now to be described.

Resiliently connected to the lever 19 by means of a spring 26 is a substantially horizontal arm 27 supported by spring 27a, see Figs. 2, 8 and 13, which arm is pivoted at 28 in plate 9 and carries an abutment 29.

The arrival of the cut out cam 2 to operative position when it engages and lies on the abutment 29 causes arm 27 to be depressed or displaced to the horizontal position shown in Fig. 8. This displacement of the arm through the agency of the spring 26 causes the lever 19 to be pulled down in relation to its pivot 20, whereby on the next forward movement of the obstructor arm the feed pawl and detent are retacted from the ratchet and a resetting of the mechanism effected.

At the same time the claw 24 hereinbefore referred to also becomes effective. With the lever 19 in its raised position the claw 24 on the U shaped member 23 moves to and fro over a lug 1' on the stirrup $k$ of the cut out plunger P but when the lever 19 is depressed by the cut out cam 2 depressing arm 27, the U shaped member comes down with it, and the claw 24 on the next reciprocating movement derived from the eccentric E engages the lug $l'$ and operates the cut out plunger P. Thereupon the machine is stopped after a predetermined number of operations as controlled by the setting of the drum 12.

On the completion of the resetting operation the lever 27 is returned to the position shown in Fig. 2 by spring 27a. Such movement through the agency of a pin 19a carried by the lever 19 and engaging the arm 27, causes the lever 19 to be raised with the arm 27. Thereby obstructor arm 18 is raised and the pawl 10 and detent 11 freed to return to engagement with the ratchet 3.

To prevent premature return of the pawl and detent, means are provided to delay the return of arm 27 to normal position after the cut out cam 2 has moved from pin 29. To this end the nose of arm 27 is engaged by means conveniently in the form of a pin 27b on a latch 27c normally lying against lever 19 and pivoted at 27d on plate 9, the latch being pulled towards arm 27 by spring 27e. Thus before arm 27 can rise under urge of spring 27a, the latch must be removed and this is effected by lever 19 striking the latch on the return stroke of eccentric E so that in the lapse of time occuring, spring 7 is able to assure return of the nut member to setting position before pawl 10 and detent 11 re-engage ratchet 3.

The nut member is formed to control also a totalling operation after a predetermined number of machine cycles. To this end the nut member 1 is provided with a cam 30 (Fig. 6A), hereafter referred to as the "total cam" which, after a predetermined advance of the nut member determined by the setting of the setting drum, stands in the path of a member actuated from an arm $q$ forming part of the machine as normally constructed, see Figs. 1, 2 and 9.

Figure 9:
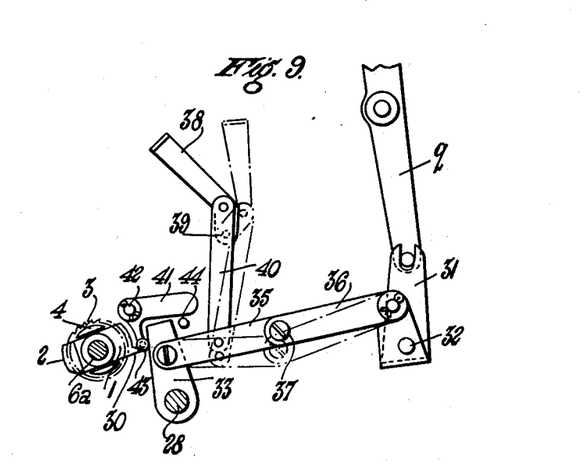

This arm $q$ as shown in said British Patent No. 271,935, rocks to and fro in the passage of each card through the attachment T, and its movement is communicated, through a U shaped rocker 31 pivoted at 32, to an arm 33 pivoted on pin 28 aforesaid through an articulated rod comprising links 35 and 36 hinged together at 37.

When the links are in alignment as shown in full lines in Fig. 9 the movements of the arm $q$ are communicated to the arm 33. The links may be moved into the position shown in chain lines in Fig. 9 through the agency of a lever 38 pivoted on pin 39 carried by plate 9 and connected by a link 40 to the link 35. When the lever 38 is in the full line position shown in Fig. 9 the links 35 and 36 are in alignment so giving rigidity to the articulated rod comprising them.

In the position of the lever 38 shown by the chain lines in Fig. 9, the articulated rod becomes limp and is unable to transmit end thrust through the U shaped member 31. This is the inoperative position and is also clearly shown in Figs. 2 and 6A.

Over the free end of the arm 33 is a small bell crank 41 pivoted on pin 42 which as shown may be the pivot pin of detent 11. The crank 41 includes an operative end 43, its other end engaging a stop pin 44 which limits the operations of the bell crank.

Before the total cam 30 reaches its operative position, the rocking movements of the arm $q$ communicated to the arm 33 merely cause, by the arm 33 abutting against the operative end 43 of the bell crank 41, a rocking movement of this bell crank about its pivot 42, but when the total cam comes into operative position it engages the operative end 43 of the bell crank 41 and the next movement of the arm $q$ is obstructed because the arm 33 cannot be moved, thereupon effecting a totalling operation in the manner described in British Patent Specification No. 271,935.

It may be desired to stop the machine when a total is taken. In such a case, the articulated rod is straightened for operation by the total cam 30 and the claw member 23 is in normal position to operate the cut-out plunger P, but in order to assure that a total operation is effected before the machine is stopped, the cams 2 and 30 are disposed in angular relation so that the operative face of the total cam 30 leads the operative face of the cut-out cam.

While the counting device is being employed to control the total mechanism of the machine, it may be desirable to cut out from operation the claw member 23 so that its claw 24 cannot operate the cut out plunger P and stop the machine.

To this end the obstructor arm 18 is mounted for relative movement over its operative lever 19 so that the obstructor arm can be brought down by the cut out cam 2 without causing the claw 24 to cause a stoppage of the machine. To this end the obstructor arm 18 is provided with a slot 18a through which it is mounted on the pivot 25 of the lever 19.

The obstructor arm 18 is also connected to the arm 27 by a strut 45 provided with a pin 45a which rests on the arm 27, the strut being resiliently connected to the arm 27 by a spring 46, and rigidly connected to the obstructor arm 18, for instance, by rivets as indicated at 47, while the lower end of the strut is slotted as indicated as 45b so that it may be guided in its movements by the pin 20. With such an arrangement (Figs. 6A, 8 and 13) the spring 27a pulls up, through the agency of the arm 27 and the pins 19a and 45a, the lever 19 and strut 45, while when the arm 27 is depressed by cut out cam 2 the lever 19 and strut 45 are pulled down through the agency of the springs 26 and 46.

Now, when it is desired that the cut out cam 2 shall not cause the claw 24 to operate as for instance when the total mechanism of the machine is being actuated from the counter, as previously described with particular reference to Fig. 9, the lever 19 is held up so that the depression of the arm 27 results in the extension of the spring 26. This holding up of the lever 19 may be effected by placing an abutment lever such as 48 in the path of a pin which may be the anchor of the spring 26 on the lever 19, and indicated at 49.

The abutment lever 48 is slotted at 48a, see Fig. 2, for the reception of a pin 50 on a manually operable pivoted switch member 51, pivoted at 51a on the plate 9. Normally the switch member 51 is in the position shown in Fig. 8 with the abutment lever downwardly inclined. Thus the lever 19 is free to travel under the influence of the cut out cam 2. But when the abutment lever 48 is in the horizontal position shown in Fig. 2 it lies against the anchor 49, whereby the lever 19 is rendered inoperative and the claw member 24 is held out of action.

The total cam 30 may conveniently be given a profile and the feed pawl 10 a lateral extension 10c (see Fig. 2) so that the continued rotation of the nut member 1, after a total operation has been caused, may be utilized to give a preliminary lift to the feed pawl from the ratchet without releasing the detent thereby preventing further movement of the ratchet and the elimination of any damage in the event of non-operation of the arm.

In such arrangement of parts the total mechanism is operated after a predetermined number of cycles in the machine and then the cut out cam causes a resetting of the counter device without the machine being stopped.

Instead of utilizing the counter to cause a total operation after a given number of cycles in the machine, the counter may be operated at each total operation of the machine and the machine stopped after a given number of totalling operations. To this end the operation of the feed pawl 10 through the agency of the telescopic rod 16 is effected by making the parts of the telescopic rod 16 relatively movable so that normally there is no communication to the feed pawl from the cam 17 but merely an extension and contraction of the rod 16, but when a total operation takes place the parts are connected to prevent relative movement so that the cam 17 operates the feed pawl.

Figure 10:
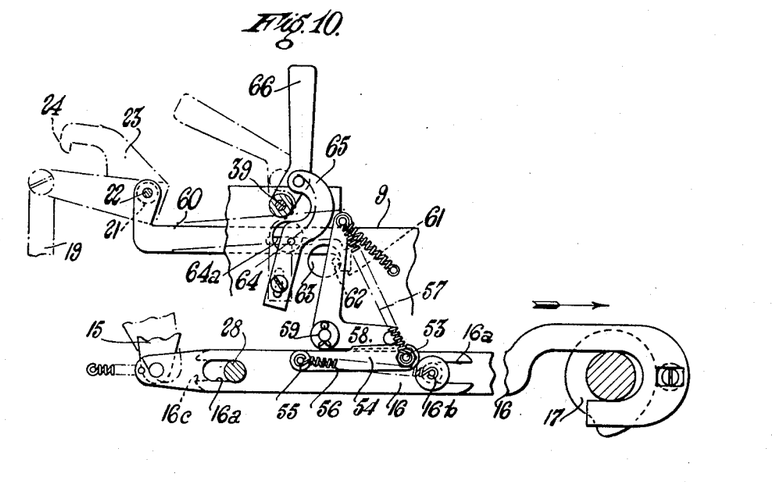

The telescopic rod 16, as clearly shown in Figs. 7 and 10, comprises two over-lapping parts guided relatively to one another by slotting the one part towards each extremity thereof as indicated at 16a and providing a pin on the other part as indicated at 16b, to ride in the one slot 16a while the pin 28 passes through the slot 16a at the other end, the part carrying pin 16b being also slotted as indicated at 16c to straddle said pin 28. Between the guide pins 16b and 28 both parts of the rod 16 are formed with a notch or recess 52 as clearly shown in Fig. 7.

When the arm 16 is contracted as shown in Fig. 7 the notches 52 are in registry and are maintained in registry by a pin 53 on a latch 54 pivoted at 55 carried on one part of the telescopic rod 16 as clearly shown in Fig. 10, the pivot pin 55 serving as an anchor for one end of a spring 56, the other end of which is connected to the other part of the telescopic rod, for example by utilizing the pin 16b as an anchorage therefor, which spring assures the alignment of the recesses at a predetermined period of revolution of the main shaft.

When the latch 54 is in the position shown in Figs. 2 and 10, the pin 53 lies in the notches 52 and the feed pawl 10 is operated at every cycle of the machine.

Now, to cause the feed pawl to be operated only on a total cycle of the machine, the latch 54 is resiliently connected, for example, by a spring 57 to a bell crank 58. The said crank is rocked about a pivot 59 on plate 9 by a strap 60 actuated from the eccentric E, conveniently by mounting the strap on the pin 22 carried on the plate g (Fig. 13) the strap 60 having a hooked formation indicated at 61, see Fig. 10, which engages a pin 62 on the back of one arm of the bell crank 58.

As indicated at 63, the support 9 of the counter device is cut away so that the pin 62 can operate through the support, the strap 60 being at the back thereof.

From the foregoing it will be understood that at each cycle of the machine the strap 60 is reciprocated through the eccentric E and the bell crank 58 is rocked.

Each time the bell crank is rocked the latch 54 is lifted and the pin 53 removed from the recess. At this time the cam 17 is operative but does not operate the feed pawl 10 as it merely causes an expansion of the telescopic rod 16.

When, however, a total operation in the machine takes place, the passage of cards through the attachment T stops and the eccentric E ceases to rotate. Hence the bell crank 58 is not operated and the pin 53 remains in the notches 52 of the parts of the telescopic member 16 so that on the following operative movement of the cam 17 the feed pawl is actuated.

By such an arrangement the feed pawl 10 is only operated at each total operation of the machine and after a predetermined number of operations the cut out cam will in manner before described operate arm 27 and cause a stoppage of the machine by actuating cut out plunger P.

When the machine is working normally, the strap 60 is raised so that its hook 61 does not engage the pin 62 on the back of the bell crank 58, whereby the pin 53 maintains the parts of the connecting rod 16 rigidly connected and the feed pawl is operated from the connecting rod at every cycle of the machine as at first herein described.

To maintain the strap 60 inoperative it may be engaged by an abutment 64 passing through a slot 64a therein and carried on a member 65 hingedly connected and depending from a manually operated lever 66 pivoted on pin 39 aforesaid as clearly shown in Fig. 10.

In the position of the lever 66 shown in full lines in Fig. 10, the abutment 64 disposes the strap so that during the reciprocation of the strap 60 its hook 61 engages the pin 62 on the bell crank 58.

When the lever 66 is rocked over to the position shown in chain lines in Fig. 10, the member 65 is lifted and the abutment 64 pulls up the strap 60 as shown in chain lines. Thereafter the reciprocations of the strap are ineffective.

From the foregoing description it will be seen that a tabulator printing machine provided with a counting device in accordance with the present invention can be caused to operate so as (a) to be stopped after a given number of cards have passed through the machine, (b) to total and stop after a given number of cards have passed through the machine, (c) to total after a given number of cards have passed through the machine, (d) to stop after a given number of total operations.

Accordingly the mechanism provides means by which the stopping and totalling operation of the tabulator can be controlled according to the number of cards fed.

It should also be noted that the employment of the total taking attachment (as described in British Patent Specification No. 271,935) modified by including the means for operating therefrom the cut out plunger P, adds the further feature that the machine is automatically stopped when there are no cards in it, so that the counter is reset at the end of a card series.

It may also be mentioned that with the said attachment operating, the counter can operate to stop the machine after a number of cards have passed through the attachment but in the combination described the setting drum will have to be set to allow for the total operation to occur in the number of cards.

It has already been explained that a counter construction according to the invention is controlled absolutely by the setting of the drum 12 on the threaded part 6a of the spindle 6.

The construction, setting and operation of the drum will now be particularly described with reference to Figs. 3 to 6.

The hub 67 of the setting drum carries a sprocket wheel 68 fixed, for instance, by a set screw 69, and associated with the sprocket is a pinion 70 fixed on a spring pressed plunger 71 displaceable in bearing member 72 by pressing on knob 73. The bearing 72 is provided with a tooth 74, and in the position shown in Fig. 4 this tooth engages in the teeth of the pinion 70 and consequently the pinion cannot move; hence the sprocket wheel 68 and the associated setting drum are locked on the spindle 6.

To set the drum, the spring pressed plunger 73 is pressed in, thereby freeing the pinion 70 from the tooth 74, and owing to the width of the pinion 70 it can be disengaged from the tooth 74 and retain its engagement with the sprocket wheel 68.

With the knob pressed in and the pinion held from tooth 74, the drum can be rotated and set on the spindle by turning the knob 73 while pressure is retained, thereby transmitting angular movement from the pin 70 and sprocket wheel 68 to the drum 12.

As clearly shown in Figs. 2 and 3, the numbers on the setting drum can be read through an opening or window 75a which may be provided with a lens to facilitate reading, in a shutter 75 slidably disposed on guides 76 carried on an external plate 9a, which plate is supported by distance pieces 9b carried on plate 9 of the apparatus and forms the support for the bearing 72 and the external end of the spindle 6a aforesaid as clearly shown in Fig. 4.

The shutter is operated through a lever conveniently of U shape or stirrup form indicated at 77 and pivoted at 78 on ears or brackets 79 extending from the front plate 9a as most clearly shown in Figs. 2 and 3. At the bottom of the U-shaped lever is a stop conveniently in the form of a pin 80, see Fig. 5. This pin lies in front of the peripheral edge of the drum 12 and is held in association with the drum by a spring 81, the upper part of the lever being provided with lugs 82 which engage with the underturned portion of the shutter member 75, see Fig. 2.

With such an arrangement, the U shaped lever 77 is tilted about its pivot 78 as the drum is set by axial displacement on the spindle 6a. Consequently there is a transverse relative movement between the shutter 75 and the numbers on the periphery 13 of the setting drum. The number on the drum visible through the window 75a of the shutter indicates the number of cycles in the machine to be completed before the feed pawl is actuated to reset the counting mechanism or to perform the totalling operation or to stop the machine or both as hereinbefore described, and by the arrangement described the pitch of the figures on the drum is greater than the pitch of the thread 6a on spindle 6 (Fig. 4) and thus larger figures may be employed.

What I claim is:

1. In a tabulator printing machine the combination of a threaded nut member, a ratchet mounted coaxially therewith, a telescopic connection between the nut member and the ratchet whereby the nut member can move axially with respect to the ratchet but cannot rotate relatively thereto, a feed pawl and detent whereby the ratchet is turned to a predetermined extent at each cycle of the machine, a spring adapted to be stressed by rotation of the ratchet, means operable by the nut member whereby the feed pawl and detent are moved out of engagement with the ratchet after a predetermined axial displacement of the nut has been effected, thereby permitting the nut to be reset by the reversal of the ratchet due to the energy conserved in the spring, and setting means for predetermining the displacement of the nut necessary to cause disengagement of the pawl and detent.

2. In a tabulator printing machine the combination of a threaded nut member, a cam carried by said nut member, means for imparting to the nut member a step by step rotation wherein the number of steps executed within a given time is equal to the number of cycles executed by the machine, a spring-controlled pivoted arm adapted to be operated by the cam after a predetermined axial displacement of the nut member, a reciprocating arm adapted to be displaced by operation of the pivoted arm into a path wherein it effects stopping of the machine, setting means for predetermining the extent to which the nut must be displaced before the machine will stop, and means whereby displacement of the reciprocating arm also returns the nut member to the resetting position.

3. In a tabulator printing machine the combination of a threaded nut member, a cam carried by said nut member, a ratchet mounted co-axially with the nut member, a telescopic connection between the nut member and the ratchet whereby the nut member can move axially with respect to the ratchet but cannot rotate relatively thereto, a feed pawl and detent whereby the ratchet is turned to a predetermined extent at each cycle of the machine, a spring adapted to be stressed by rotation of the ratchet, a spring-controlled pivoted arm adapted to be operated by the cam after a predetermined axial displacement of the nut member, setting means for predetermining the displacement of the nut necessary to cause operation of the pivoted arm, and a reciprocating arm adapted to be displaced by operation of the pivoted arm into a path wherein it moves the feed pawl and detent out of engagement with the ratchet, whereupon the energy conserved in the spring reverses the ratchet and returns the nut member to the resetting position.

4. In a tabulator printing machine the combination of a threaded nut member, a cam carried by said nut member, means for imparting to the nut member a step by step rotation wherein the number of steps executed within a given time is equal to the number of cycles executed by the machine, a spring-controlled pivoted arm adapted to be operated by the cam after a predetermined axial displacement of the nut member, a reciprocating arm adapted to be displaced by operation of the pivoted arm into a path, wherein it effects stopping of the machine, setting means for predetermining the extent to which the nut must be displaced before the machine will stop, and means whereby displacement of the reciprocating arm also returns the nut member to the resetting position.

5. In a tabulator printing machine the combination of a threaded nut member, a cam carried by said nut member, a ratchet mounted co-axially with the nut member, a telescopic connection between the nut member and the ratchet whereby the nut member can move axially with respect to the ratchet but cannot rotate relatively thereto, a feed pawl and detent whereby the ratchet is turned to a predetermined extent at each cycle of the machine, a spring adapted to be stressed by rotation of the ratchet, a spring-controlled pivoted arm adapted to be operated by the cam after a predetermined axial displacement of the nut member, setting means for predetermining the displacement of the nut necessary to cause operation of the pivoted arm, and a reciprocating arm adapted to be displaced by operation of the pivoted arm into a path wherein it moves the feed pawl and detent out of engagement with the ratchet, and causes a cut-out plunger to be actuated to stop the machine, the disengagement of the pawl from the ratchet permitting the energy conserved in the spring to reverse the ratchet and return the nut member to the resetting position.

6. In a tabulator printing machine the combination of a threaded nut member, means for imparting to the nut member a step by step rotation wherein the number of steps executed within a given time is equal to the number of cycles executed by the machine, total mechanism, an articulated arm adapted to be reciprocated by the total mechanism, and an abutment disposable in the path of the arm and controlled by the nut member whereby the arm is obstructed after a given number of cycles and a total operation caused.

7. In a tabulator printing machine the combination of a threaded nut member, means for imparting to the nut member a step by step rotation wherein the number of steps executed within a given time is equal to the number of cycles executed by the machine, total mechanism, an articulated arm adapted to be reciprocated by the total mechanism, an abutment adapted to be moved into the path of the arm by the nut member after the latter has been displaced axially to a predetermined extent, whereby the arm is obstructed after a given number of cycles and a total operation caused, and setting means for predetermining the extent to which the nut must be displaced before the total operation is caused.

8. In a tabulator printing machine the combination of a threaded nut member, a total cam carried thereon, means for imparting to the nut member a step by step rotation wherein the number of steps executed within a given time is equal to the number of cycles executed by the machine, total mechanism, an articulated arm adapted to be reciprocated by the total mechanism, an abutment adapted to be moved into the path of the arm by the total cam after the nut member has been displaced axially to a predetermined extent, whereby the arm is obstructed after a given number of cycles and a total operation caused, and setting means for predetermining the extent to which the nut must be displaced before the total operation is caused.

9. In a tabulator printing machine the combination of a threaded nut member, a ratchet mounted co-axially therewith, a telescopic connection between the nut member and the ratchet whereby the nut member can move axially with respect to the ratchet but cannot rotate relatively thereto, a feed pawl and detent whereby the ratchet is turned to a predetermined extent at each cycle of the machine, a spring adapted to be stressed by the rotation of the ratchet, a cut-out cam carried by the nut member, a spring-controlled pivoted arm adapted to be operated by the cut-out cam after a predetermined axial displacement of the nut member, setting means for predetermining the displacement of the nut necessary to cause operation of the pivoted arm, a reciprocating arm adapted to be displaced by operation of the pivoted arm into a path wherein it moves the feed pawl and detent out of engagement with the ratchet whereupon the energy conserved in the spring reverses the ratchet and returns the nut member to the resetting position, a total cam carried on the nut member and total mechanism adapted to be operated by the total cam after a predetermined axial displacement of the nut member whereby a total operation is caused as the result of completing a predetermined number of cycles.

10. In a tabulator printing machine the combination of a threaded nut member, total mechanism, a telescopic actuating rod connecting the total mechanism to the nut member, whereby a step by step rotation is imparted to the nut member, wherein each step corresponds to a totalling operation, removable means adapted to connect together the parts of the telescopic rod and means whereby the said parts are only connected and transmit movement to the nut member when a total operation occurs.

11. In a tabulator printing machine the combination of a threaded nut member, total mechanism, a telescopic actuating rod comprising mutually guiding parts and connecting the total mechanism to the nut member, a latch carried on one of said parts and adapted to engage with the other, and means whereby said latch is rendered inoperative during normal operation but is left operative when a total operation takes place, whereby the nut member is advanced one step for each total operation.

12. In a tabulator printing machine the combination of a threaded nut member, a cam carried by said nut member, a ratchet mounted coaxially with the nut member, a telescopic connection between the nut member and the ratchet whereby the nut member can move axially with respect to the ratchet but cannot rotate relatively thereto, a feed pawl and detent adapted to rotate the ratchet step by step, total mechanism, a telescopic actuating rod comprising mutually guiding parts and connecting the total mechanism to the feed pawl, a latch carried on one of said parts and adapted to engage with the other part and means whereby said latch is rendered inoperative during normal operation but is left operative when a total operation takes place.

13. In a tabulator printing machine, the combination of a threaded nut member, a total cam carried thereon, means for imparting to the nut member a step by step rotation wherein the number of steps executed within a given time is equal to the number of cycles executed by the machine, total mechanism adapted to be operated by the total cam after a predetermined axial displacement of the nut member whereby a total operation is caused as the result of completing a predetermined number of cycles, setting means for predetermining the extent to which the nut must be displaced before the total operation takes place, and means for resetting the nut member automatically when it has been displaced to the predetermined extent.

ARTHUR THOMAS.